US011625303B2

United States Patent
Bhowmik et al.

(10) Patent No.: US 11,625,303 B2
(45) Date of Patent: Apr. 11, 2023

(54) AUTOMATIC INCREMENTAL REPAIR OF GRANULAR FILESYSTEM OBJECTS

(71) Applicant: NetApp, Inc., Sunnyvale, CA (US)

(72) Inventors: Sushrut Bhowmik, Bangalore (IN);
Vinay Kumar B C, Mysore (IN);
Sreenath Korrakuti, Bangalore (IN);
Arun Kumar Pandey, Bangalore (IN);
Sateesh Kumar Pola, Bangalore (IN)

(73) Assignee: NetApp, Inc., San Jose, CA (US)

( * ) Notice: Subject to any disclaimer, the term of this patent is extended or adjusted under 35 U.S.C. 154(b) by 310 days.

(21) Appl. No.: 15/631,477

(22) Filed: Jun. 23, 2017

(65) Prior Publication Data
US 2018/0373596 A1 Dec. 27, 2018

(51) Int. Cl.
| | |
|---|---|
| *G06F 11/14* | (2006.01) |
| *G06F 16/16* | (2019.01) |
| *G06F 16/17* | (2019.01) |
| *G06F 3/06* | (2006.01) |
| *G06F 11/07* | (2006.01) |

(52) U.S. Cl.
CPC ........ *G06F 11/1435* (2013.01); *G06F 16/164*
(2019.01); *G06F 16/17* (2019.01); *G06F 3/067*
(2013.01)

(58) Field of Classification Search
None
See application file for complete search history.

(56) References Cited

U.S. PATENT DOCUMENTS

| | | | | |
|---|---|---|---|---|
| 5,809,527 | A * | 9/1998 | Cooper | G06F 12/0866 707/999.2 |
| 6,895,413 | B2 | 5/2005 | Edwards | |
| 9,665,581 | B1 * | 5/2017 | Patel | G06F 12/00 |
| 2005/0097141 | A1 * | 5/2005 | Loafman | G06F 16/10 |
| 2009/0183056 | A1 * | 7/2009 | Aston | G06F 11/1004 714/799 |
| 2014/0195564 | A1 * | 7/2014 | Talagala | G06F 12/0804 707/802 |
| 2016/0224587 | A1 * | 8/2016 | Thompson | G06F 16/164 |
| 2017/0272209 | A1 * | 9/2017 | Yanovsky | G06F 12/0253 |

OTHER PUBLICATIONS

Salim Rouayheb; Automatic structural metadata identification based on multilayer prosodic information;2010;IEEE; pp. 1510-1517 (Year: 2010).*

* cited by examiner

*Primary Examiner* — Amresh Singh
*Assistant Examiner* — Jermaine A Mincey
(74) *Attorney, Agent, or Firm* — Loza & Loza, LLP; Tejinder Singh (57) ABSTRACT

Presented herein are methods, non-transitory computer readable media, and devices triggering a metadata recovery process within a network storage system, which include: dividing metadata into metadata segments, wherein each of the metadata segments is tasked to perform a specific file system operation function, validating each of the metadata segments during the specific file system operation function; upon failure to validate at least one of the metadata segments, triggering an automatic repair process while maintaining the operation function tasked to the metadata segment, and upon finalizing the automatic repair process, resuming the specific file system operation function tasked to the metadata segment.

20 Claims, 3 Drawing Sheets

AUTOMATIC INCREMENTAL REPAIR OF GRANULAR FILESYSTEM OBJECTS

TECHNICAL FIELD

The present disclosure relates generally to mass data storage networks and data storage filing systems. More particularly, aspects of this disclosure relate to methods, non-transitory computer readable media, and devices for triggering a metadata recovery process while maintaining an original operation on hold to ensure the operation does not get blocked because of inconsistencies and the metadata inconsistencies are incrementally fixed.

BACKGROUND

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block. Another type of file system is a write-anywhere file system that does not over-write data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors. Moreover, inconsistencies can develop from file system corruption as a result of a disk or hardware level corruption, or because of logical software bugs and memory scribbles.

In conventional file systems, a scanner is implemented to go through the entire file system to restore consistencies, regardless of the inconsistency size. Traditionally, such file system checkers work in offline mode, resulting in an inaccessible file system. Example of such checkers are fsck, chkdsk etc. There are other known online file system checkers, which provide regular client access when the scanner performs, and are described in commonly assigned U.S. Pat. No. 6,895,413 entitled "SYSTEM AND METHOD FOR PERFORMING AN ON-LINE CHECK OF A FILE SYSTEM," issued May 17, 2005, which is hereby incorporated by reference in its entirety. A common drawback to online scanners is they typically need to be initiated manually.

Furthermore, offline file system checkers cause complete downtime until the checker finishes scanning. Modern server systems have low tolerance on outages, thus the complete downtime becomes unacceptable in many cases. While online consistency checkers provide continuous access apart from the beginning phase of scan preparation, online checkers, because of their resource intensiveness, slow down system performance. With increased disks size, file systems are also increasing in size. Any performance lags result in longer scanner runtime, and cause longer disruptions. Also, with software defined storage (SDS) and cloud environments, provisioning manual support to contend with such situations is cumbersome. There is therefore a need for automatic, non-disruptive, lightweight handling for such file system inconsistency situations.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

The present disclosure is directed to a system and method for triggering a metadata recovery process while maintaining an original operation on hold to ensure the operation does not get blocked because of inconsistencies and the metadata inconsistencies are incrementally fixed. As used herein, the term "file system" generally refers to the computer-executable code operable on a computer to perform a storage function that manages data access and may, in the case of a storage system, implement data access semantics of a general purpose operating system. The mass data storage system can also be implemented as a microkernel, an application program operating over a general-purpose operating system, such as UNIX® or Windows NT®, or as a general-purpose operating system with configurable functionality, which is configured for storage applications as described herein.

In addition, it will be understood by those skilled in the art that the disclosure described herein may apply to any type of special-purpose (e.g., file server, filer or storage serving appliance) or general-purpose computer, including a stand-alone computer or portion thereof (i.e. a workload), embodied as or including a storage system. Moreover, the teachings of this disclosure can be adapted to a variety of storage system architectures including, but not limited to, a network-attached storage (NAS) environment, a storage area network (SAN), a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. It should be noted that while this description is written generally in terms of a log-structured file system, the teachings of the present disclosure may be utilized with any suitable file system, including a Write Anywhere File Layout (WAFL®) file system.

It is desirable to provide a system and method that ensures an operation does not get blocked because of an inconsistency and metadata inconsistencies are incrementally fixed. One way to do so is by slicing the entire file system metadata set into numerous metadata segments, represented by relationship equations, and validating each metadata segment during the relevant operation on those metadata. If the validation fails, an automatic repair method is triggered that maintains the original operation on hold. The repair method acts on the granular file system metadata objects, corrects the relationship equations and at the conclusion resumes the original operation. In this embodiment, the file system recovery from corruption becomes on-demand, automatic and lightweight.

Disclosed, for example, is a subsystem that has two distinct parts: detection points and a repair handler. In some embodiments, the detection points can be distributed in all of the file system operation functions. A file system operation would typically have a phase in which all metadata, disk blocks are loaded in the memory (load phase) and a separate phase where the file system operation is committed on those blocks and metadata (commit phase). The detection points operate between these two phases, in a separate distinct certification phase (certify phase). In the certify phase, all metadata in use are certified to be in a good state, before proceeding to the commit phase. The certifications assert on a boolean condition involving metadata equations. The metadata equations can be applied to those metadata that are loaded and used in the operation. This will ensure the certification method does not introduce any additional overhead on the system.

If during the certification phase, a certify condition fails, the repair handler is initiated and the original operation is paused. The certification phase produces a certify statement, which specifies which repair method needs to be invoked in order to repair the inconsistency. In some embodiments, the repair method can have more elaborate detection functionality. It is also possible to have multiple certify conditions mapping to a single repair method. The repair method checks the consistency of a slice of the file system, which includes the original certify conditions, and applies fixing methods to restore consistency in the specific part of the file system. In this way, the present embodiment of the disclosure provides incremental repair without downtime.

In exemplary embodiments of the disclosure, the repair handler wakes up the original operation which now can be reactivated. The embodiments disclosed herein ensure no operation suffers from road-block because of inconsistencies in metadata. The repair handler is generally short and synchronous. In some embodiments, the repair handler accounts for special circumstances where the file system global properties cannot be validated unless a scanner processes the entire file system and builds a collective information from the system. In such cases, the claimed repair handler does localize fix commence the operation. A file system level scanner (manual or automatic) would be required to fix the global inconsistencies.

Examples of such file system global properties are global block accounting counters, bitmaps, accountability of lost blocks, etc. The shorter repair methods cannot ensure the consistency of the global properties. For example, the file system keeps account of the number of blocks used or free. This number cannot be validated unless a scanner goes through the whole file system and counts all used blocks. Similarly this is applicable for bitmaps which indicate whether a block is allocated or free. This information cannot be validated comprehensively without traversing the entire file system. As a result, it cannot be determined if another inode is containing a particular block or not.

However, when the disclosed repair handler is run, it is able to account of such global inconsistencies. A general purpose scanner, iterator or handler for an object can be implemented to scan the entire system without intense scrutiny. For example, a set of inodes which constitute a subsystem, a virtual container can be implemented. Depending on the type and extent of the global inconsistencies a right combination of iterator and repair function can be implemented. The combination of certify and repair handler takes care of localized problems in metadata, whereas lightweight purpose-based background scanners lazily fixes the global problems.

Figure 1:
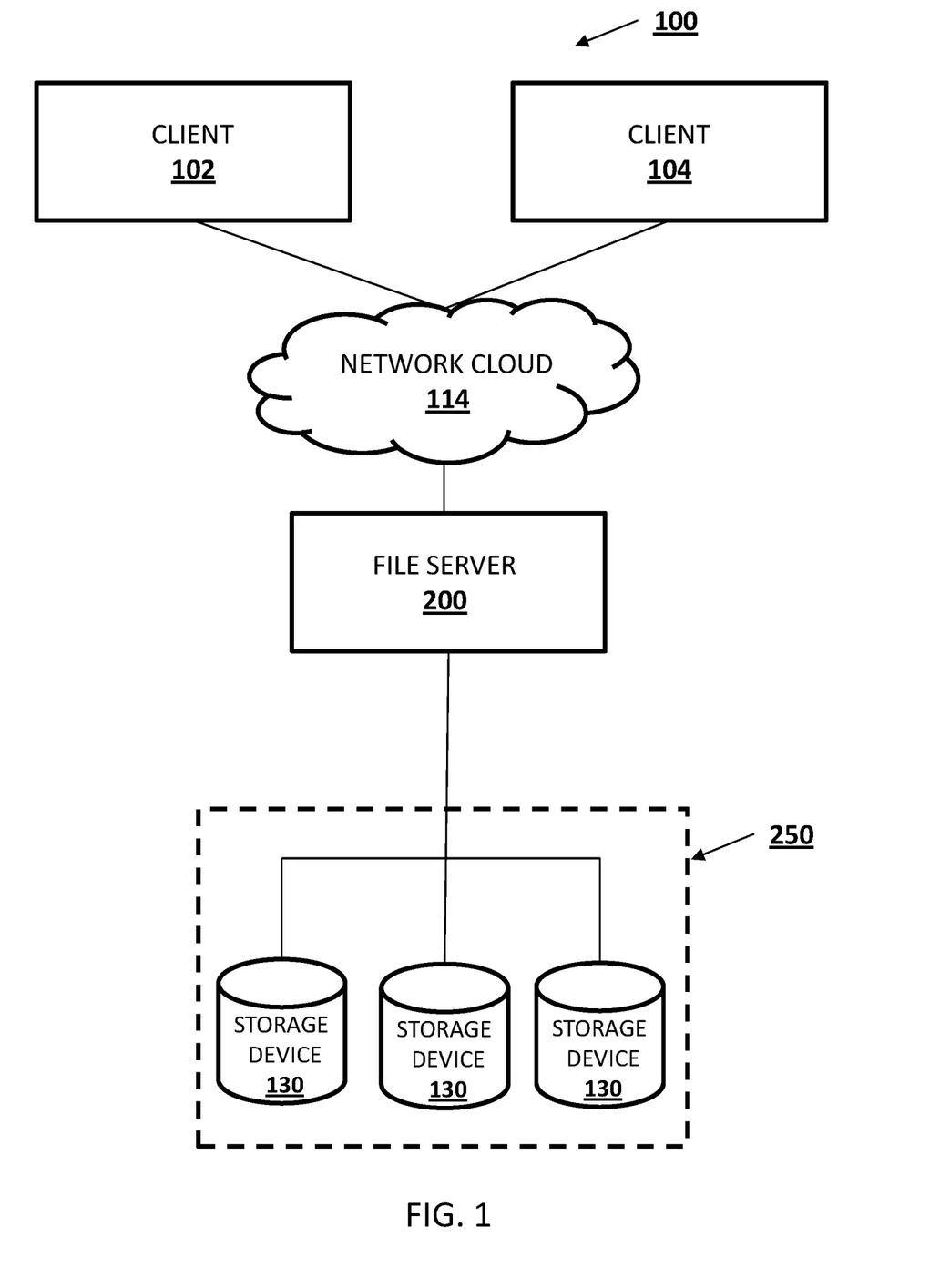
FIG. 1 exemplifies a schematic block diagram of a network environment including a file server in accordance with embodiments of the disclosure.

Referring now to the drawings, wherein like reference numerals refer to like features throughout the several views, there is shown in FIG. 1 a block diagram of an example of an exemplary network environment 100, in accordance with some embodiments of the present disclosure. The network environment 100 includes clients 102 and 104. The network environment 100 is based around a network cloud 114. This network cloud 114 can be a local or network (LAN), a wide area network (WAN), virtual private network (VPN) utilizing communication links over the internet, for example, or a combination of LAN, WAN and VPN implementations can be established. For the purposes of this description, the term network cloud should taken broadly to include any acceptable network architecture. The network cloud 114 interconnects various clients 102, 104. Also attached to the network cloud is a file server 200.

The clients 102 and 104 can be computers or other processing systems capable of accessing the file server 200 either directly or indirectly over a network cloud 114. The clients 102 and 104 can access the file server 200 over the network cloud 114 using wireless or wired connections supporting one or more point-to-point links, shared local area networks (LAN), wide area networks (WAN), or other access technologies. The clients 102 and 104 can be accessing data, applications, raw storage, or various combinations thereof stored on the file server 200. The file server 200, described further below, is configured to control storage of, and access to, data and a set 250 of interconnected storage devices 130.

The storage server 124 is configured to operate according to a client/server model of information delivery thereby allowing multiple clients 102 and 104 to access files or other data simultaneously. In this model, the client 102 or 104 can be a computer running an application, such as a file-system protocol. Each client 102 or 104 can request the services of the file server 200 by issuing storage-system protocol messages. For example, the clients 102 and 104 can request to either read data from or write data to the file server 200.

In the example of FIG. 1, the file server 200 is a file-level server, such as a server used in a NAS environment, a block-level storage server used in a SAN environment, or other storage systems capable of providing both file-level and block-level service. For example, the file server 200 can use a combination of software and hardware to provide storage services including the organization of information on storage devices 130, such as disks. The file server 200 includes a file system to organize logically the information as a hierarchical or other structure of directories and files on the disks 130.

Although the file server 200 is illustrated as a single unit in FIG. 1, it can also be implemented in a distributed architecture. For example, the file server 200 can be implemented with multiple distributed storage servers (not shown). Additionally, the file server 200 can also include a physically separate network module and disk module (not shown), which communicate with other storage servers over an external interconnect. The network module functions as a front-end of the file server 200, exporting services to the clients 102 and 104. The disk module functions as the back-end, managing and implementing a parity declustered distribution of a Redundant Array of Independent Disks (RAID) organization on the underlying storage of the file server 200.

Figure 2:
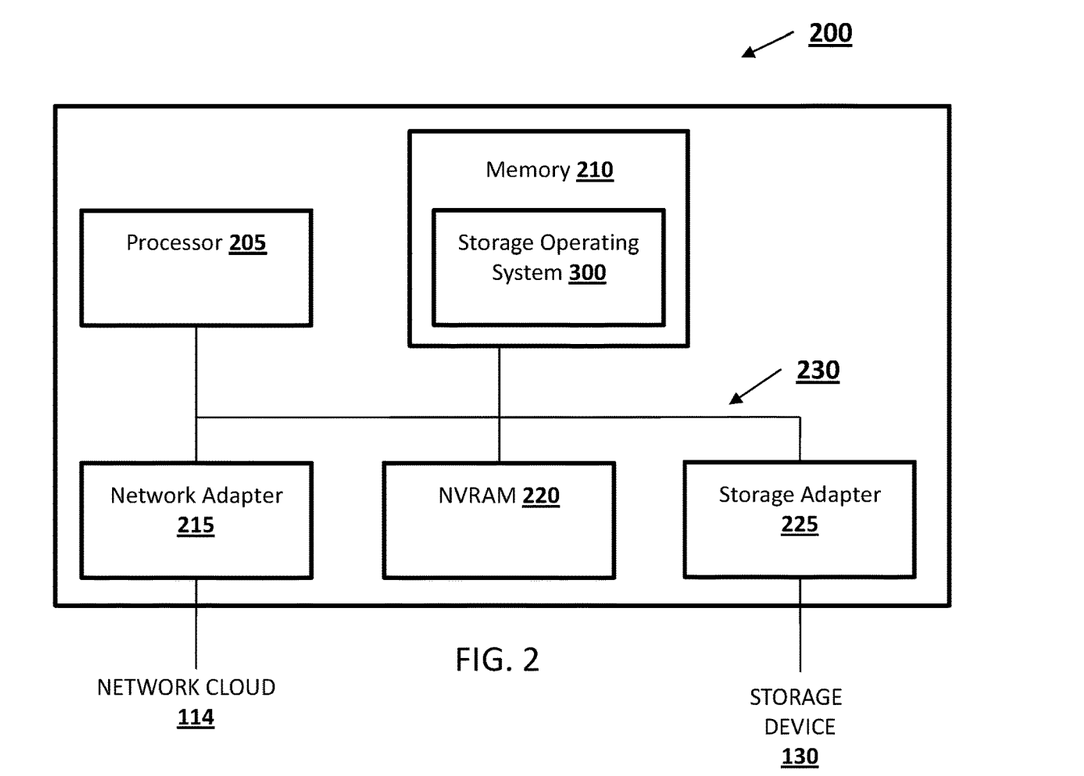
FIG. 2 is a schematic block diagram of the file server of FIG. 1 in accordance with some embodiments of the disclosure.

FIG. 2 is a schematic block diagram of the file server of FIG. 1 in accordance with some embodiments of the disclosure. The file server 200 comprises a processor 205, a memory 210, a network adapter 215, a nonvolatile random access memory (NVRAM) 220 and a storage adapter 225 interconnected by system bus 230. Contained within the memory 210 is a storage operating system 300 that implements a file system to logically organize the information as a hierarchical structure of directories and files on the disks. In the illustrative embodiment, the memory 210 comprises storage locations that are addressable by the processor and adapters for storing software program code. The operating system 300 contains portions, which are typically resident in memory and executed by the processing elements. The operating system 300 functionally organizes the filer by inter alia, invoking storage operations in support of a file service implemented by the file server.

The network adapter 215 comprises a mechanical, electrical and signaling circuitry needed to connect the file server 200 to clients 102, 104 over network cloud 114. Moreover, the client 210 may interact with the filer server 200 in accordance with the client/server model of information delivery. That is, the client may request the services of the file server, and the file server may return the results of the services requested by the client, by exchanging packets defined by an appropriate networking protocol. The storage adapter 225 incorporates with the storage operating system 300 executing on the file server to access information requested by the client. Information may be stored on the storage devices 130 that is attached via the storage adapter 225 to the file server. The storage adapter 225 includes input/output (I/O) interface circuitry that couples to the disks over in I/O interconnect arrangement, such as a Fibre Channel serial link topology. The information is retrieved by the storage adapter and, if necessary, processed by the processor 205 (or the adapter 225 itself) prior to be forwarded over the system bus 230 to the network adapter 215, where information is formatted into appropriate packets and returned to the client 210.

In one exemplary file server implementation, the file server can include a non-volatile random access memory (NVRAM) 220 that provides fault-tolerant backup of data, enabling the integrity of filer server transactions to survive a service interruption based upon a power failure, or other fault.

To facilitate the generalized access to the storage devices 130, the storage operating system 300 implements a write-anywhere file system that logically organizes the information as a hierarchical structure of directories and files on the disks. Each "on-disk" file may be implemented as a set of disks blocks configured to store information, such as data, whereas the directory may be implemented as a specially formatted file which other files and directories are stored.

Figure 3:
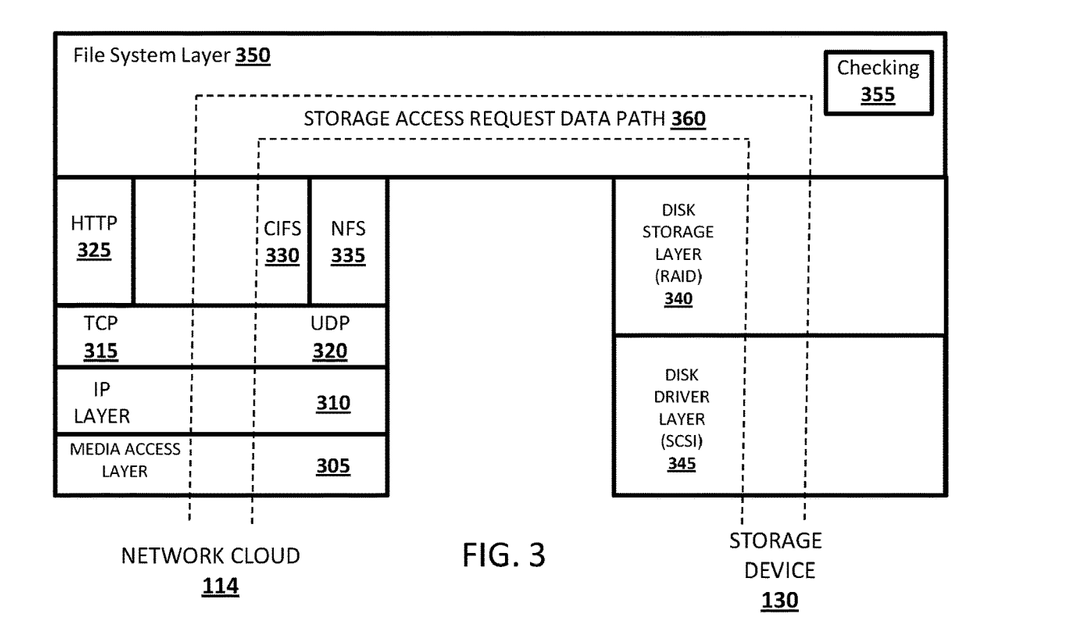
FIG. 3 is a schematic block diagram of an exemplary storage operating system for use with the file server of FIG. 2 in accordance with embodiments of the disclosure.

FIG. 3 is a schematic block diagram of a storage operating system 300 stored within the file server 200 that can be advantageously used with the present disclosure. The storage operating system comprises a series of software layers, including a media access layer 305 of network drivers (e.g., an Ethernet driver). The storage operating system 300 further includes network protocol layers, such as the Transport Control Protocol (TCP) layer 315 and the User Datagram Protocol (UDP) layer 320 and a supporting Internet Protocol (IP) layer 310.

A file system protocol layer provides multi-protocol data access and, to that end, includes support for the Network File System (NFS) protocol 335, the Common Internet File System (CIFS) protocol 330 and the Hyper Text Transfer Protocol (HTTP) 325. In addition, the storage operating system 300 includes a disk storage layer 340 that implements a disk storage protocol, such as a RAID protocol, and a disk driver layer 345 that implements a disk access protocol such as, e.g., a Small Computer System Interface (SCSI) protocol.

Bridging the disk software layers with the network and file system protocol layers is a file system layer 350 of the storage operating system 300. Generally the file system layer 350 implements a file system having an on-disk format representation that is block-based using, e.g., 4-kilobyte (KB) data blocks and using inodes to describe the files. In response to transaction requests, the file system generates operations to load (retrieve) the requested data from storage devices 130 if it is not resident "in-core," i.e., in the filer's memory 210. If the information is not in memory, the file system layer 350 indexes into the inode file using the inode number to access an appropriate entry and retrieve a logical volume block number. The file system layer 350 then passes the logical volume block number to the disk storage (RAID) layer, which maps that logical number to a disk block number and sends the latter to an appropriate driver (for example, an encapsulation of SCSI implemented on a fiber channel disk interconnection) of the disk driver layer. The disk driver accesses the disk block number from storage devices 130 and loads the requested data in memory 210 for processing by the file server 200. Upon completion of the request, the file server 200 (and storage operating system) returns a reply, e.g., a conventional acknowledgement packet defined by the CIFS specification, to the clients 102, 104 over the network cloud 114.

It should be noted that the storage access request data path 360 through storage operating system layers described above needed to perform data storage access for the client requests received the file server may alternately be implemented in hardware, software or a combination of hardware and software. That is, in an alternative embodiment of this invention, the storage access request data path 360 may be implemented as logic circuitry embodied within a field programmable gate array (FPGA) or in an application specific integrated circuit (ASIC). This type of hardware implementation increases the performance of the file service provided by the file server 200 in response to a file system request issued by a client. The file system checking processes 355 within the file system layer 350 of the storage operating system permits file system validation and recovery.

Figure 4:
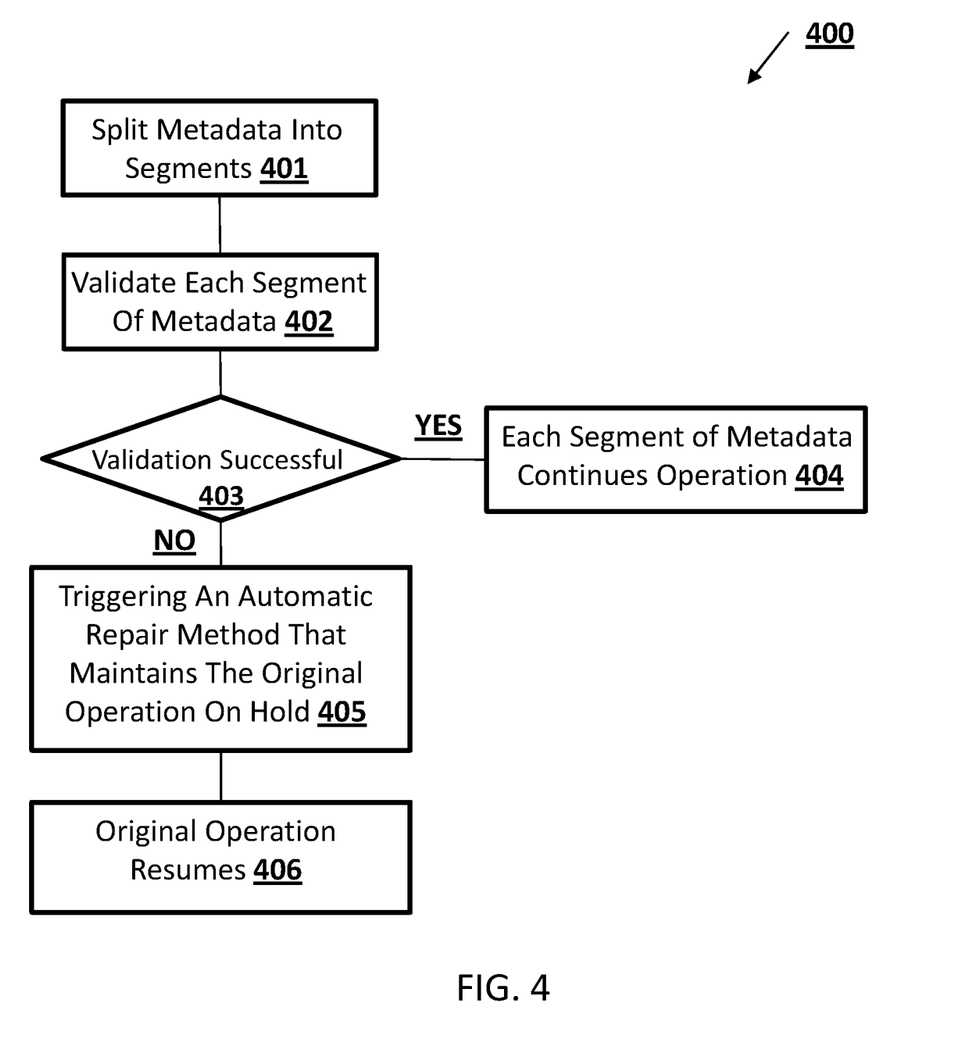
FIG. 4 illustrates a process flow diagram of a method for triggering a metadata recovery process while maintaining an original operation on hold in accordance with an exemplary embodiment of the disclosure.

FIG. 4 illustrates a process flow diagram of a method for triggering a metadata recovery process while maintaining an original operation on hold, indicated by general reference character 400. The process 400 commences at step 401 where metadata stored in the memory 210 of the file server 200 is divided into segments. For example, metadata can be segmented in different levels. One level of metadata can include filesystem level. In some exemplary embodiments, filesystem level metadata can include bitmaps, block refcounts, block accounting counters. Another level of metadata can include inode level. Inode properties can include link count, back pointer to the directory entry, permissions. A level of metadata can also include tree level. For example, tree level metadata can include indirect blocks which points to next level of indirect or data blocks. Finally, a level of metadata can include block level. Block level can include metadata entries and user data. Metadata entries maintain the filesystem state, accounting etc. The nature and size of the metadata entries can vary depending on the metadata. For example, for bitmaps, an entry is a bit. For refcount, an entry is a 16-bit number. For directory, an entry is a hardlink.

Each segment of the metadata can be represented by relationship algorithms.

At this point, each metadata segment is tasked to a specific file system operation function within the file server 200. For example, the metadata can include aggregate metadata, where the aggregate metadata includes general metadata and an aggregate file system reference. The aggregate metadata can contain data that enables other components to access the aggregate file system. In some examples, the aggregate metadata's file system operation function can include describing how data is partitioned on the storage device and the address of each individual partition. The aggregate metadata can be stored at a known location in the memory 210, allowing the file server 200 to access the aggregate metadata without referring to other data. Thus, the file server 200 can read the aggregate metadata and determine where data, such as operating system data, is located in the file server 200. The layout of the data in the file server 200 can thus vary as long as the aggregate metadata is stored at the known location.

Furthermore, the metadata can include file metadata. File metadata can include information pertinent to each file, not already included in the file data (the file data is typically the contents of the file). For example, file metadata can include one or more names for the file and other possible metadata for the file, such as timestamps for when the file was last read from or written to. The file metadata's file system operation function can include accessing control information for the file, such as (a) Unix "permissions" bits, and related bits such as the "use-owner-permissions" bit, or (b) Unix group identifiers or owner identifiers for the file. Furthermore, the file metadata's file system operation function can include linking information for the file, such as (a) a whether the file is a symbolic link or a Unix "hard" link, or (b) the target file or Unix inode for the link.

Detection points can be distributed in all of the file system operation functions. A file system operation can have a phase in which all metadata, disk blocks are loaded in the memory 210 (load phase) and a separate phase where the file system operation is committed on those blocks and metadata (commit phase).

At step 402, the sliced segments of metadata are validated during the operation of those metadata slices. Once the metadata is divided into segments, multiple validations have to be completed. In some embodiments of the disclosure, the segments are chosen for validation based on how filesystem metadata are designed. Specifically, a segment of metadata can be chosen for validation based on the current operation which is acting-on (or using) the segment of metadata. For example, for link operation (Unix 'ln' command), directory entry and the target inode are relevant segments of metadata, which are in use.

The distributed relationship between metadata entries are done on the relevant metadata which are used as part the operation. As an initial matter, a local property validation can be completed. The local property validation can be completed on a block or inode granularity. In some embodiments, this can include loading the metadata. Once loaded, the sanity of the metadata can be validated. Furthermore, the local properties of the metadata can be validated. The distributed relationship between each metadata can also be validated. At step 403, a determination is made as to the success of the validation. If the validation is unsuccessful, an automatic repair method can implemented to revalidate and fix inconsistencies. Then the metadata is validated again. However, where the validation is successful, the process 400 proceeds to step 404 where the divided metadata can be implemented herein and advance to the operation previously tasked.

If the validation fails, the process 400 proceeds to step 405 where an automatic repair method is triggered that maintains the original operation on hold. The detection points operate between the load phase and the commit phase, in a separate distinct certification phase (certify phase). In the certify phase, all metadata in use are certified to be in a good state, before proceeding to the commit phase. The certifications assert on a boolean condition involving metadata equations. In some embodiments, the metadata equations are only applied to those metadata that are loaded and used in the operation. This will ensure the certification method does not introduce any additional overhead on the system. The repair method acts on the granular file system metadata objects, corrects the relationship equations.

For example, directories are the file system objects, which contain hard-links to the inodes. At the same time each inode contains a back pointer to the directory entry (representing hard-link). Ideally, the directories and the inodes should maintain some consistency. While performing any hard-link related operation (like unlink, lookup, rename), this relationship can be validated to ensure it is not broken. If the validation fails, a repair handler can implement a necessary repair action. For example, the repair handler can either correct the back-pointer (if the current back-pointer looks incorrect), add the back-pointer (if multiple hard-links are allowed for the inode) or clear the hard-link (if current back-pointer looks valid and multiple hard-link is not allowed).

In another example, an inode contains a tree of indirect buffers to point to inode data. Indirect buffers contain references to the lower level blocks which can be another indirect or data. The indirect block entries can be validated against local properties (block number it is pointing to, is within valid range), or, distributed property (the child block meta information agrees with the pointer). Upon failure to validate, the repair handler would mark the segment of the tree inaccessible.

At step 406, at the conclusion of the automatic repair method, the original operation resumes. In exemplary embodiments of the disclosure, a repair handler wakes up the original operation which now can be reactivated. The embodiments disclosed herein ensure no operation suffers from road-block because of inconsistencies in metadata. The repair handler is generally short and synchronous. In this embodiment, the file system recovery from corruption becomes on-demand, automatic and lightweight.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects.

What is claimed:

1. A method, executed by one or more processors, comprising:
dividing metadata used by a file system of a storage operating system in a network storage system to execute file system operations into a plurality of levels, each level having a metadata segment associated with a file system operation function, the plurality of levels including a file system level metadata associated with a file system global property impacting a plurality of file system operation functions and a block level metadata associated with one or more blocks used by the file system to store data at a storage device;
during a load phase for executing a current file system operation function, loading, by the file system, metadata segments with the file system level metadata and the block level metadata and a data block for the current file system operation function in a memory, the current file system operation function comprising a certify phase, after the load phase, for validating the loaded metadata segments and a commit phase, after a successful certify phase for committing the current file system operation function on the loaded metadata segments and the data block;
during the certify phase of the current file system operation function, validating, by a checking process of the file system, a local property at a block level for the loaded metadata segments and a distributed property on a relationship of the loaded metadata segments to certify a state of the loaded metadata segments;
in response to a failure to validate at least one of the loaded metadata segments, using an automatic repair process of the file system, during the certify phase, to incrementally repair an inconsistency in the at least one of the loaded metadata segments indicated by the failure, while maintaining the current file system operation function on hold;
asserting a boolean condition associated with the relationship between the loaded metadata segments during the automatic repair process, when the inconsistency involves the relationship;
indicating a failed global property of the file system level metadata, when the inconsistency involves the failed global property of the file system level metadata and the repair process of the file system fails to repair the inconsistency; and
upon successful completion of the automatic repair process, executing the commit phase for applying the current file system operation function to the loaded metadata segments and the data block.

2. The method of claim 1, wherein validating each of the loaded metadata segments during the current file system operation function comprises: validating, during the certify phase, detection points distributed in the current file system operation function.

3. The method of claim 1, further comprising: indicating, during the certify phase, a repair method used for repairing the inconsistency.

4. The method of claim 1, further comprising: utilizing a global scanner, external to the file system, to repair the indicated failed global property, when the repair process fails to repair the inconsistency, and using the automatic repair process of the file system for repairing any inconsistency associated with the block level metadata.

5. The method of claim 1, wherein the failed global property is associated with a counter that tracks free blocks available for use by the file system and blocks already in use by the file system.

6. The method of claim 1, further comprising: upon failure to validate by the automatic repair process, marking a portion of an inode tree structure used by the file system as being inaccessible, when the inconsistency involves the portion of the inode tree structure.

7. The method of claim 1, further comprising: replacing, by the automatic repair process, a back-pointer from an inode to a file system directory, during the certify phase, when the inconsistency is associated with the back-pointer.

8. A non-transitory machine-readable medium having stored thereon instructions for performing a method comprising machine executable code which when executed by at least one machine, causes the machine to:
segment metadata used by a file system of a storage operating system in a network storage system to execute file system operations into a plurality of levels, each level having a metadata segment associated with a file system operation function, the plurality of levels including a file system level metadata associated with a file system global property impacting a plurality of file system operation functions and a block level metadata associated with one or more blocks used by the file system to store data at a storage device;
during a load phase for executing a current file system operation function, load by the file system, metadata segments with the file system level metadata and the block level metadata and a data block for the current file system operation function in a memory, the current file system operation function comprising a certify phase, after the load phase, for validating the loaded metadata segments and a commit phase, after a successful certify phase for committing the current file system operation function on the loaded metadata segments and the data block;

during the certify phase of the current file system operation function, validate by a checking process of the file system, a local property at a block level for the loaded metadata segments and a distributed property on a relationship of the loaded metadata segments to certify a state of the loaded metadata segments;

in response to a failure to validate at least one of the loaded metadata segments, use an automatic repair process of the file system, during the certify phase, to incrementally repair an inconsistency in the at least one of the loaded metadata segments indicated by the failure, while maintaining the current file system operation function on hold;

indicate a failed global property of the file system level metadata, when the inconsistency involves the failed global property of the file system level metadata and the repair process of the file system fails to repair the inconsistency; and upon successful completion of the automatic repair process during the certify phase, execute the commit phase for applying the current file system operation function to the loaded metadata segments and the data block.

9. The non-transitory computer readable medium of claim 8, wherein validating each of the loaded metadata segments during the current file system operation function comprises: validate, during the certify phase, detection points distributed in the current file system operation function.

10. The non-transitory computer readable medium of claim 8, wherein the machine executable code further causes the at least one machine to: indicate, during the certify phase, a repair method used for repairing the inconsistency.

11. The non-transitory computer readable medium of claim 8, wherein the machine executable code further causes the at least one machine to: utilize a global scanner, external to the file system, to repair the indicated failed global property, when the repair process fails to repair the inconsistency, and use the automatic repair process of the file system for repairing any inconsistency associated with the block level metadata.

12. The non-transitory computer readable medium of claim 8, wherein the failed global property is associated with a counter that tracks free blocks available for use by the file system and blocks already in use by the file system.

13. The non-transitory computer readable medium of claim 8, wherein the machine executable code further causes the at least one machine to: upon failure to validate, mark, by the automatic repair process, a portion of an inode tree structure used by the file system as being inaccessible, when the inconsistency involves the portion of the inode tree structure.

14. The non-transitory computer readable medium of claim 8, wherein the machine executable code further causes the at least one machine to: replace, by the automatic repair process, a back-pointer from an inode to a file system directory, during the certify phase, when the inconsistency is associated with the back-pointer.

15. A computing device, comprising: a memory containing machine readable medium comprising machine executable code having stored thereon instructions for triggering a metadata recovery process within a network storage system; and a processor coupled to the memory, the processor configured to execute the machine executable code to cause the processor to:

divide metadata used by a file system of a storage operating system in a network storage system to execute file system operations into a plurality of levels, each level having a metadata segment associated with a file system operation function, the plurality of levels including a file system level metadata associated with a file system global property impacting a plurality of file system operation functions and a block level metadata associated with one or more blocks used by the file system to store data at a storage device;

during a load phase for executing a current file system operation function, load by the file system, metadata segments with the file system level metadata and the block level metadata and a data block for the current file system operation function in a memory, the current file system operation function comprising a certify phase, after the load phase, for validating the loaded metadata segments and a commit phase, after a successful certify phase for committing the current file system operation function on the loaded metadata segments and the data block;

during the certify phase of the current file system operation function, validate, by a checking process of the file system, a local property at a block level for the loaded metadata segments and a distributed property on a relationship of the loaded metadata segments to certify a state of the loaded metadata segments;

in response to a failure to validate at least one of the loaded metadata segments, use an automatic repair process of the file system, during the certify phase, to incrementally repair an inconsistency in the at least one of the loaded metadata segments indicated by the failure, while maintaining the current file system operation function on hold;

indicate a failed global property of the file system level metadata, when the inconsistency involves the failed global property of the file system level metadata and the repair process of the file system fails to repair the inconsistency; and upon successful completion of the automatic repair process during the certify phase, execute the commit phase for applying the current file system operation function to the loaded metadata segments and the data block.

16. The computing device of claim 15, wherein validating each of the loaded metadata segments during the current file system operation function comprises: validate, during the certify phase, detection points distributed in the current file system operation function.

17. The computing device of claim 15, wherein the machine executable code further causes the processor to: indicate, during the certify phase, a repair method used for repairing the inconsistency.

18. The computing device of claim 15, wherein the machine executable code further causes the processor to: utilize a global scanner, external to the file system, to repair the indicated failed global property, when the repair process fails to repair the inconsistency, and use the automatic repair process of the file system for repairing any inconsistency associated with the block level metadata.

19. The computing device of claim 15, wherein failed global property is associated with a counter that tracks free blocks available for use by the file system and blocks already in use by the file system.

20. The computing device of claim 15, wherein the machine executable code further causes the processor to: upon failure to validate, mark, by the automatic repair process, a portion of an inode tree structure used by the file system as being inaccessible, when the inconsistency involves the portion of the inode tree structure.

* * * * *